March 27, 1945.   H. P. WILLIAMS   2,372,620
BLIND LANDING SYSTEM USING ELECTROMAGNETIC WAVES
Filed April 9, 1942    2 Sheets-Sheet 1
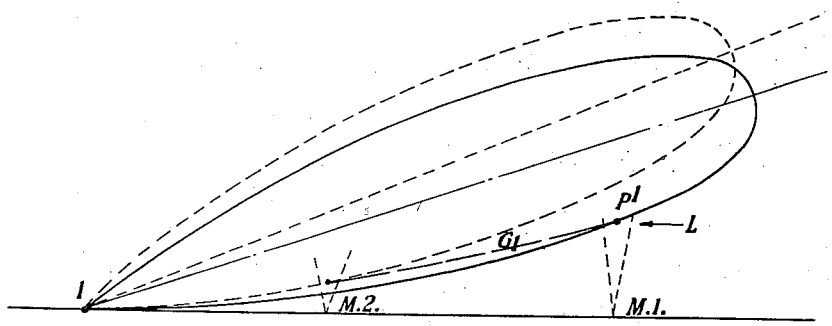
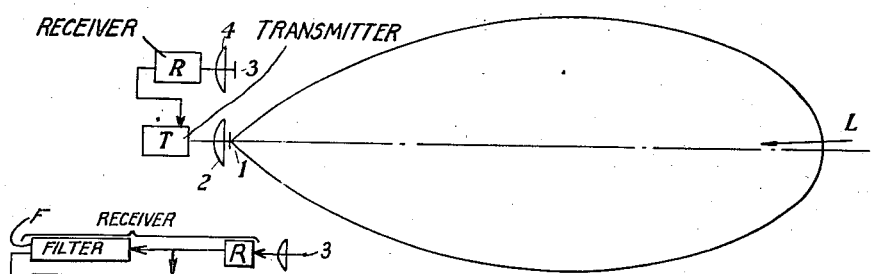
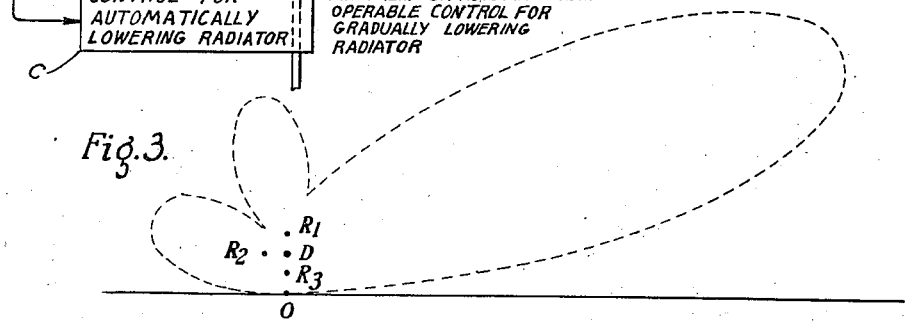
INVENTOR
BY H.P. Williams
ATTORNEY Patented Mar. 27, 1945

2,372,620

UNITED STATES PATENT OFFICE 2,372,620

BLIND LANDING SYSTEM USING ELECTROMAGNETIC WAVES

Herbert Paul Williams, London W. C. 2, England, assignor to International Standard Electric Corporation, New York, N. Y.

Application April 9, 1942, Serial No. 438,296
In Great Britain November 20, 1940

18 Claims. (Cl. 250—11)

This invention relates to blind landing systems of the kind wherein the glide path comprises a path of constant field strength, and one object of the invention is to obtain an improved shape of glide path to facilitate the landing of aircraft.

According to the invention, a radio blind landing system of the kind specified comprises arrangements for projecting a radio beam along the landing path of the aircraft, and means for varying one or more of the factors determining the field strength of the beam at any position in space as the aircraft glides down the beam. In one arrangement for carrying out the invention, the intensity or the direction of the beam or both may be varied.

The change in direction or intensity of the beam is preferably chosen so that the glide path is a straight line for most of the downward path, and then follows a square or other desired law for the last portion of the path.

According to one practical arrangement for producing the required changes in the beam and which applies to beams utilizing centimetre wavelengths whereby a sharp beam may be produced, the tilt of the beam is varied as the aircraft glides in, producing lines of constant field strength, which gives an ideal glide path shape.

The beam may be produced by one or more parabolic mirrors or radiating horns in known manner, so as to produce a single beam having an overall width of about 10°, with its axis directed 5° or more upwards, so that an aircraft coming in at say 600 feet up and 15,000 feet away meets the square law pattern of the polar radiation distribution diagram. The beam frequency may be any desirable value in the centimeter range of wavelengths, the actual value chosen depending on the antenna system employed.

The variation in the tilt of the beam is then obtained by varying the position of an antenna inside the metal reflector associated therewith, or, alternatively, by changing the phase or currents in a small array of reflectors, or by varying the angular position in the vertical plane of an antenna-reflector combination or other antenna array.

According to another practical arrangement for producing the required changes in the beam, which is applicable to wavelengths of the order of a few metres, the intensity of the beam is changed as the aircraft glides in. In this case it is preferable to use horizontally polarized waves to obtain a reliable pattern with ground reflections.

In both these cases referred to, the result of failure of the beam control devices is not a crash of the landing aircraft, but only an inferior glide path. This is due to the fact that for both cases a stationary beam produces a square law guide path.

Practical arrangements for carrying out these two methods will now be described in some detail, reference being made to the accompanying drawings in which Fig. 1 shows the radiation energy distribution diagram in a vertical plane containing the desired glide path;

Fig. 2A shows the energy distribution of the same beam transmitter as for Fig. 1, in a horizontal plane;

Fig. 2B shows diagrammatically an arrangement for varying the tilt of the beam by varying the position of an antenna inside its reflector;

Fig. 3 shows diagrammatically in end view an antenna array for producing a radiation energy distribution as shown in Figs. 1 and 2 and utilizing ground reflection;

Figure 4:
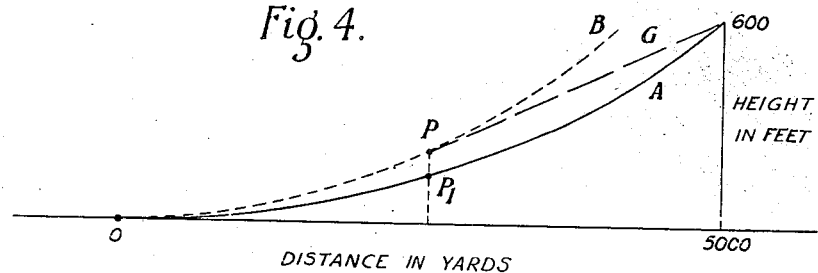
Fig. 4 shows a diagram for explaining an arrangement using inner and outer marker beacons for indicating moments when the beam changes should be commenced and terminated.

The first arrangement to be described is based on the method of varying the tilt of the beam and uses a wavelength of 30 cms.; the second arrangement to be described is based on varying the intensity of the beam and uses a wavelength of 3 ms.

It will be understood that these wavelengths, and certain other values given in this specification, are given by way of example only; moreover, there are other known alternative component arrangement which may be used in the system according to the invention, but the main principle on which the specific equipments described operate, will be made clear.

In the first arrangement illustrated in Fig. 1 in which the tilt of the beam is varied as the aircraft approaches the landing field the glide path beam is produced by a horizontal dipole 1 situated at the focus of a parabolic mirror 2 of 5 operating wavelengths in diameter. If the focal length of this mirror is 100 cms., a sharp beam of overall angular width of 12° will be produced in the vertical plane.

By suitably changing the tilt of the beam, it is possible to arrange that the glide path indicated at G1, Fig. 1, of constant field strength is a straight line between an outer marker beacon M1 which marks the point P1 at which the aircraft should commence to descend, and an inner marker beacon M2 at which the glide path changes from a straight line to a square law curve for the final landing. This straight line portion M1, M2 of the glide path may be obtained by slowly raising the beam in a vertical plane after the aircraft has passed over the outer marker M1, and then lowering it again as the aircraft nears the inner marker beacon or the edge M2 of the aerodrome. The direction of approach of an aircraft is indicated by the arrow L.

The maximum upward tilt required is 1½°, and this is produced in the present example by lowering the transmitting dipole 1 a distance of 3 centimeters.

Controlling the tilt

The distance of the incoming aircraft from the transmitting antenna 1 is measured by known arrangements, for instance using well known altimeter technique, as described for example in R. C. Newhouse Patent No. 2,247,662, and the resultant measurement is used to control automatically the tilting of the beam. This is diagrammatically shown in Fig. 2B. For example, as in a known altimeter arrangement, the frequency of the transmitter is cyclically varied over a frequency range (the frequency sweep) so that a receiver R associated with a parabolic mirror 4 and dipole 3 placed near the transmitting antenna arrangement 1—2 will receive a beat frequency due to interaction between directly received waves from the transmitter T and the reflected waves from the aircraft.

The frequency sweep need not be large since distances less than 3,000 feet need not be measured as the radiation pattern is stationary over the last 3,000 feet since the radiation distribution of the transmitting antenna itself gives a square law path. The maximum distance measured is 15,000 feet; this corresponds to the maximum beat frequency. A filter F is provided in the ground receiver circuit R, the output of which causes in any known manner the automatic control C to commence when the maximum beat frequency is first received. It will be clear to those versed in the art that by the use of suitable audio frequency filters and automatic volume control, practically any law can be obtained for "beat frequency" versus "beam controlling voltage."

In the present case a suitable frequency sweep is ±1 mc. performed at 50 cycles per second.

With this sweep a beat frequency of 64,000 is obtained when the aircraft is at the outer marker (at 4800 metres distant from the beam transmitter) and a frequency of 1600 at the inner marker (at 1200 metres distant from the beam transmitter).

The above frequency modulation sweep may be obtained by mechanical means such as rotating condensers or electrically by modulation of the electrodes of an oscillator known by the trade-mark Klystron as is well known.

When such a distance determining arrangement is used as shown in Fig. 2B at I, giving a continuous indication of the distance of the aircraft, the marker beacons M1, M2 are not necessary. They do, however, in themselves indicate the moments at which the beam variation should be commenced and terminated, especially when this variation is done manually.

When utilizing the marker beacons, the instant when the aircraft passes through the beacon beam may be indicated in known manner on a receiver suitably located to receive the wave reflected from the aircraft. When the reflected wave is received from the outer marker beacon M1, manual control may commence and when the reflected wave is received from the inner beacon M2 the control should cease.

Referring now to the second case, namely controlling the intensity of the beam, the glide path is produced by a horizontal dipole or array of dipoles raised above the ground to give a suitable square law pattern with ground reflections. One such known array is shown in Fig. 3 in which D is a directly excited radiator dipole and R1, R2 and R3 are tuned reflector dipoles. D is a distance OD above the ground equal to one half the operating wavelength, and $DR1=DR2=DR3=$ one quarter the operating wavelength.

Instead of the beam being tilted as in the former case described, the exciting current of the antenna system is reduced by modulating the final stage of the transmitter, manually or automatically under the control of the distance measurement as previously explained in the tilting case, as shown schematically in Fig. 2A by the connection from the receiver R to the transmitter T.

The maximum reduction in exciting current is of the order of 50% of the maximum current, and takes place when the aircraft is at the point P, Fig. 4, position equivalent to the inner marker beacon M2, Fig. 1. Had the radiated power remained constant, the aircraft would have been at $P_1$ (Fig. 4).

At the wavelength used in this arrangement, namely 3 metres, the beam will not be very sharp so that other aircraft in the vicinity are liable to set up spurious reflections.

Figure 5:
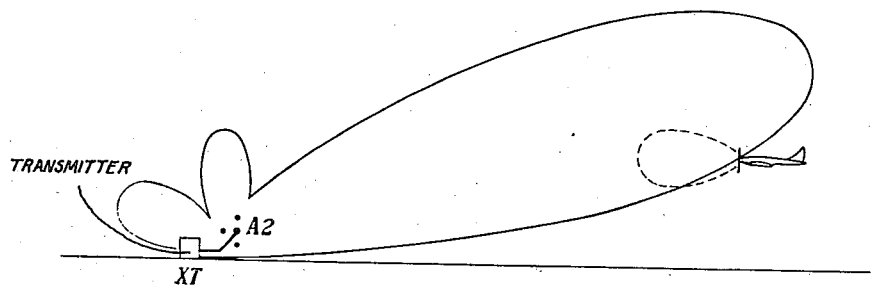
Figs. 5 and 6 show an arrangement for obtaining the distance of the aircraft to give the moments when the beam changes should be commenced and terminated.
Figure 6:
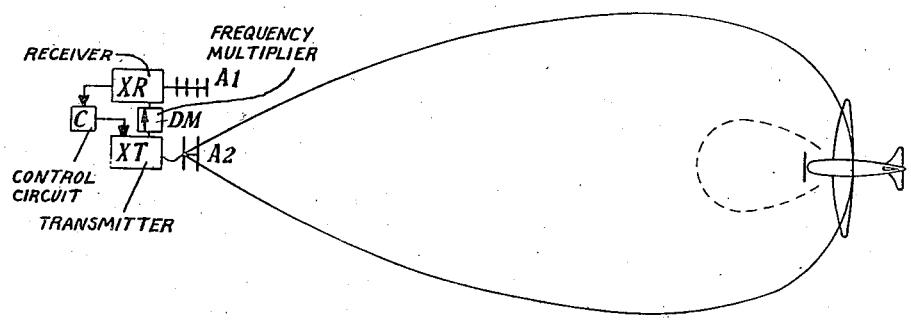

These spurious reflections can be avoided altogether by the arrangements described hereinafter with reference to Figs. 5 and 6, utilising the frequency sweep arrangements referred to.

In these figures a ground transmitter XT feeds an atenna arrangement A2. A receiver XR is associated with a highly directive antenna system A1 of the "Yagi" type for example. DM is a frequency doubler or change stage which is fed from the transmitter XT and feeds the doubled or otherwise changed frequency to the receiver XR for forming a beat frequency with a wave transmitted from the aircraft. C is a control circuit modulating the output of the transmitter XT.

Some of the high frequency signal received on the aircraft is amplified by a receiver in the aircraft (this may be a part of the main receiver), and then is passed through a single doubler or other changer stage whose output is of the order of 2 to 3 watts.

From this stage the doubled or changed frequency is fed to an antenna system of the aircraft which is designed to radiate mainly forwards, and the radiated signal is then received by the receiver antenna A1 near the aerodrome transmitter antenna A2. This receiver and antenna XR and A1 are tuned to the doubled or changed frequency.

Consequently, reflected waves at the original transmitter frequency do not affect the aerodrome receiver XR.

This aerodrome receiver also has injected into it a little of the transmitter output via the doubler or frequency changer stage DM as already stated. The "direct" and "indirect" waves beat together to produce a low frequency signal the frequency of which is proportional to the distance of the aircraft from the aerodrome transmitter location.

Incidentally, this beat frequency is twice (or differs accordingly depending upon the frequency change brought about) what it would have been were it not for the frequency doubling. To multiply the original frequency by more than two (e. g. by three or four) would only make the practical problems more difficult, though such multiplication is possible in the invention.

The audio beat frequency produced is passed through filters to give the required law, as hereinbefore described in the case of tilting the beam. This time, instead of controlling the tilt of the beam (which is impractical at wavelengths of the order of 3 metres), the transmitter output current fed to the antenna system is controlled, either by a known absorption arrangement or by direct modulation of the H. T. to the final stage.

The amount of frequency sweep in this case is preferably reduced to ±250 kc. at 50 cycles per second. With this amount of frequency sweep, it is possible to make the radiation for an approach system also serve as the radiation for a glide path, provided the polarization is horizontal.

It will be clear that the features of the two cases may be combined. If, for instance, the sharp beam produced on centimetre wavelengths was considered to give insufficient protection against spurious reflections, the method of re-radiation from the aircraft may be employed. In this case it might be preferable to re-radiate without frequency doubling or changing owing to the great difficulties existing at present in the amplification of centimetre wavelengths.

It is quite simple with any of the aforementioned variations to provide the aerodrome staff with an indication of the position of the incoming aircraft.

The beat frequency obtained in the aerodrome receiver is a measure of the distance of the aircraft from the beam transmitter. Using one of the well known frequency measuring circuits, it is possible, therefore, to provide the control tower with a continuous indication of the position of the aircraft.

By slightly amplitude modulating the beam, it is possible to transmit the beat frequency to the aircraft, which also would then have a continuous indication of its distance from the aerodrome. The use of inner and outer marker beacons would then become unnecessary. Alternatively, the beat frequency may be transmitted to the aircraft on a separate channel. The invention has particular advantages when applied to ships, e. g. aircraft carriers, as in such cases no marker beacons or other widely dispersed apparatus can be employed.

It will be observed from the foregoing description that the shape of the glide path is capable of immediate adjustment at the aerodrome transmitter.

What is claimed is:

1. In a radio system for guiding an aircraft to a blind landing, an aerodrome transmitter including means for projecting a beam of radio waves having a predetermined radiation pattern suitable for providing a path of constant field intensity to be followed by the landing aircraft, said path having portions thereof which depart from the desired glide path for the aircraft, and means for adjusting said beam to maintain said constant field intensity path in register with the desired glide path of the aircraft at a distance from the transmitter equal to that of the landing aircraft.

2. In a radio system according to claim 1, the combination in which said beam adjusting means includes means for changing the direction of the beam while the aircraft is being guided thereby.

3. In a radio system according to claim 1, the combination in which said beam adjusting means includes means for varying the intensity of the beam while the aircraft is being guided thereby while maintaining the beam positioned in the same direction.

4. In a radio system for guiding an aircraft to a blind landing, an aerodrome transmitter including means for projecting a beam of radio waves having a predetermined radiation pattern suitable for providing a path having a constant field intensity to be followed by the landing aircraft, the field intensity of said pattern along portions of the desired line of travel for the aircraft differing from said constant intensity, aircraft means for transmitting waves depending on said field intensity, and aerodrome means responsive to waves received from the aircraft while following the desired glide path for adjusting the field strength of said pattern in space to maintain said constant intensity at the points being passed by the aircraft.

5. In a radio system according to claim 4, the combination in which said field intensity adjusting means includes means for changing the direction of the beam while the aircraft is being guided thereby.

6. In a radio system according to claim 4, the combination in which said field intensity adjusting means includes means for varying the intensity of the beam while the aircraft is being guided thereby while maintaining the beam positioned in the same direction.

7. The method of radio transmission for guiding an aircraft to a blind landing which includes projecting from the ground a beam of radio waves having a predetermined radiation pattern suitable for providing a glide path having a constant field intensity to be followed by the aircraft, the field intensity of portions of said pattern along the desired path for the aircraft differing from said constant intensity, and adjusting the field strength of said pattern in space to maintain said constant intensity at the points being passed by the aircraft while traversing the desired glide path.

8. The method of radio transmission for guiding an aircraft to a blind landing at a predetermined place on an aerodrome which includes projecting from the ground a beam of radio waves having a curved line of constant field intensity for guiding the landing aircraft, producing a glide path of constant field intensity having an upper portion which is substantially straight by changing the field of the beam in space to said constant intensity at points in said glide path which are spaced from said predetermined landing place the same distance as the landing aircraft, and employing said curved line of constant field intensity for guiding the aircraft downward from the lower end of said straight line to said predetermined landing place.

9. In a radio system for guiding an aircraft to a blind landing, an aerodrome transmitter including means for projecting a beam of radio waves having a predetermined radiation pattern suitable for providing a path having a constant field intensity to be followed by the landing aircraft, the field intensity of portions of said pattern along the desired glide path for the aircraft differing from said constant intensity, means for determining the distance of the landing aircraft from said transmitter, and means responsive to said distance determining means for adjusting the field strength of said pattern in space to maintain said constant intensity at the points being passed by the aircraft.

10. In a radio system for guiding an aircraft to a blind landing, an aerodrome transmitter including means for projecting a beam of radio waves having a predetermined radiation pattern suitable for providing a path having a constant field intensity to be followed by the landing aircraft, the field intensity of portions of said pattern along the desired glide path for the aircraft differing from said constant intensity, means for determining the distance of the landing aircraft from said transmitter, and means responsive to said distance determining means for changing the direction of said beam to adjust the field strength of said pattern in space to said constant intensity at the points being passed by the aircraft.

11. In a radio system according to claim 9, the combination in which said distance determining means includes means in said transmitter for transmitting to the landing aircraft a wave cyclically modulated in frequency over a predetermined frequency range, said distance determining means also including an aerodrome receiver for the frequency modulated wave reflected by the aircraft, said receiver including means for beating together the transmitted wave and said reflected wave, said field strength adjusting means being responsive to the resulting beat wave energy in said receiver for controlling said transmitter.

12. In a radio system according to claim 9, the combination in which said distance determining means includes means in said transmitter for transmitting to the landing aircraft a wave cyclically modulated in frequency over a predetermined frequency range, aerodrome means for receiving a first wave returned back from the aircraft in response to said transmitted wave and for receiving a second wave directly from said transmitter, and means for making one of said first and second waves a multiple of the other, said receiving means including means for beating together said first and second waves, said field strength adjusting means being responsive to the resulting beat wave energy in said receiving means for controlling said transmitter.

13. In a radio system according to claim 9, the combination including means responsive to said distance determining means for modulating the wave radiated by said transmitter to indicate to the aircraft its distance from the transmitter.

14. In a radio system according to claim 9, the combination in which said distance determining means includes an outer marker beacon indicating the position at which said gradual adjustment of the field strength of said pattern is to begin when the aircraft begins gliding down the desired landing path, an inner marker beacon indicating the position on the glide path where said gradual adjustment of the field strength of said pattern is to be terminated, aerodrome means at said transmitter for receiving waves from the aircraft corresponding with the instants when the aircraft passes said marker beacons, and means responsive to the output of said receiving means for controlling said transmitter in accordance with the position of the aircraft between said marker beacons.

15. The method of guiding an aircraft to a landing which comprises projecting a radio beam into space to produce a glide path of a predetermined field strength for said aircraft, guiding said aircraft along said path and varying the radiation pattern of said beam in synchronism with the movement of said aircraft along said path to correct the angle of the said path with respect to the landing ground.

16. The method of guiding an aircraft to a landing which comprises projecting a radio beam into space in the direction of landing of an aircraft to produce a glide path of constant field strength, guiding said aircraft along said path and simultaneously varying in synchronism with the movement of said aircraft a factor determining the field strength of the beam in space, to correct the angle of said path with respect to the landing ground.

17. The method of radio transmission for guiding a craft by radiation having predetermined field intensity values along a predetermined desired path to be followed by the craft, said method including projecting along said path a beam of radio waves, making the field intensity of the radiation of said beam reaching at least one point on said path equal to said predetermined value for said point while making the field intensity at certain other points on said path differ from said predetermined values for said points, and varying the field intensity of the beam along said desired path in timed relation with the movement of the craft along said path to progressively produce said predetermined field intensity value along that part of the path being followed by the craft.

18. In a radio system for guiding a craft by radiation having predetermined field intensity values along a predetermined desired path to be followed by the craft, means for projecting to said path a beam of radio waves, means for making the field intensity of the radiation of said beam reaching at least one point on said path equal to said predetermined value for said point while making the field intensity at certain other points on said path differ from said predetermined values for said points, and means for varying the field intensity of the beam along said path in timed relation with the movement of the craft along said path to progressively produce said predetermined field intensity value along that part of the path being followed by the craft.

HERBERT PAUL WILLIAMS.